June 2, 1964      R. E. MALCHO      3,135,905

SHAFT SYNCHRONIZING AND PHASING MOTOR CONTROL SYSTEM

Filed June 27, 1960      2 Sheets-Sheet 1

INVENTOR.
BY ROBERT E. MALCHO
ATTORNEY

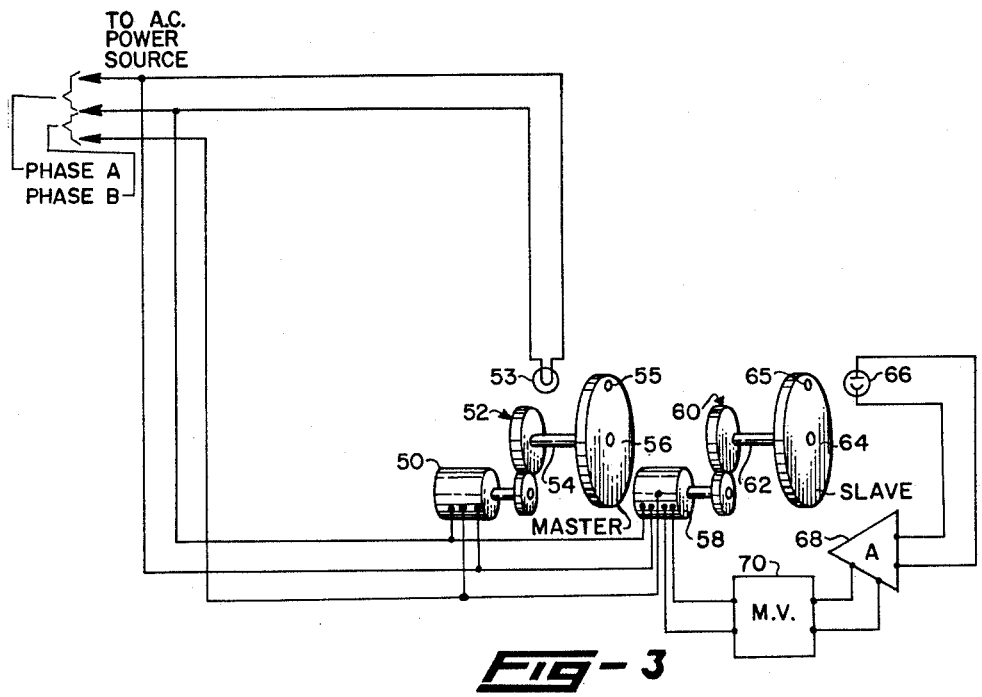

United States Patent Office 3,135,905
Patented June 2, 1964

3,135,905
SHAFT SYNCHRONIZING AND PHASING MOTOR CONTROL SYSTEM
Robert E. Malcho, Monrovia, Calif., assignor to Aerojet-General Corporation, Azusa, Calif., a corporation of Ohio
Filed June 27, 1960, Ser. No. 39,075
9 Claims. (Cl. 318—74)

This invention generally relates to a system for rotating motor shafts in phase synchronism, and particularly to a means for automatically detecting and controlling the phase ambiguities which arise when two shafts required to rotate in synchronism are driven through gear trains from separate synchronous motors.

This application is a continuation-in-part of my copending U.S. patent application, Serial No. 617,493, filed October 22, 1956.

It is well known in the art that when two shafts required to rotate in synchronism are driven through gear trains from separate synchronous motors, a gear reduction ratio of N will produce N ambiguous phase positions or notches of the gear train output shafts. Phase errors will be at least equal to 360° divided by the ratio of the electrical supply frequency to the output shaft frequency. It is also known that a system to automatically detect and control these ambiguities must have a resolution at least equal to 360° divided by the ratio of electrical supply frequency to the output shaft frequency. When the ambiguities have been eliminated the instantaneous phase accuracy of the output shaft is equal to the instantaneous phase accuracy of the motor shafts divided by the gear train ratio.

When the motors driving the shafts to be phase-synchronized are synchronous motors, such a synchronizing system may be predicated on the principle that a polarized, synchronous motor can be caused to slew (change the phase of its shaft) while it is in synchronism with the reference shaft. The slewing is accomplished by changing the phase of the stator magnetic field with respect to the rotor field by reversing the motor line connections in a manner whereby the shaft rotation is not reversed. Each change of the stator field, while the motor is in synchronous rotation, will cause the rotor to slew 360 electrical degrees divided by the number of phases for which the motor is wound. If the motor is a two-phase type, or single split-phase, the rotor will slew 180 electrical degrees. If it is a three-phase type, it will slew 120 electrical degrees. The number of poles in the motor then establishes the corresponding number of mechanical degrees by which the rotor will slew. Therefore, by successively changing the stator field during synchronous operation, the rotor will be caused to step around to a chosen position. An example of a system utilizing this basic principle is disclosed in U.S. Patent 1,658,660 to O. C. Traver, entitled, "Signaling System" and issued February 7, 1928.

The present invention specifically relates to a system utilized with polarized synchronous motors operating from the same voltage source. Each motor has the same step-down gear ratio as required by the system to produce the required synchronous output shaft speed. The gearing ratio directly reduces the phase errors which exist between the motor shafts. The system provided automatically eliminates the phase ambiguities produced at the output gear shafts.

It is therefore the principal object of the present invention to provide a novel method of and improved means for automatically minimizing the output gear train phase ambiguities between polarized synchronous motors excited from a common power source and their respective driven gear shafts of equal ratios.

With this and other objects in view, the invention comprises a synchronizing circuit having means to sense the phase position of the control shaft with respect to a reference shaft at each revolution. When the shafts are out of phase synchronism, the synchronizing circuit causes a change of the phase of the controlled shaft by changing the phase of the driving motor stator magnetic field with respect to its rotor field, said phase being repetitively changed at successive intervals until synchronism is regained.

Still further objects and features of the invention will hereinafter appear in the following specification and accompanying illustrative drawings wherein:

FIG. 3 is another embodiment of the present invention showing an alternate circuit for achieving phase synchronism.

Figure 1:
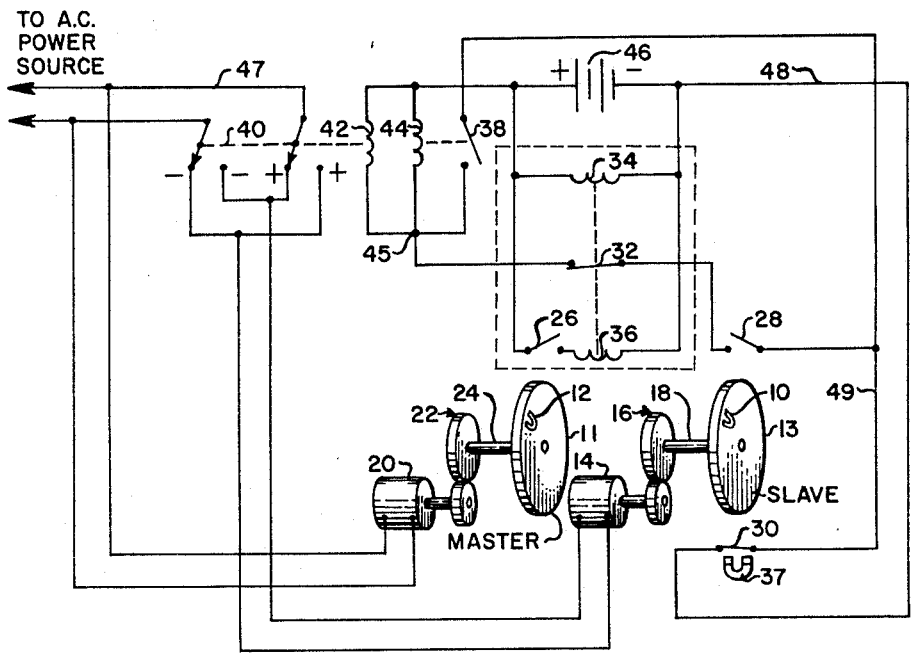
FIG. 1 is a schematic diagram of a system employing the synchronism circuit of the present invention, the driving and driven shafts being shown in synchronism.
Figure 2:
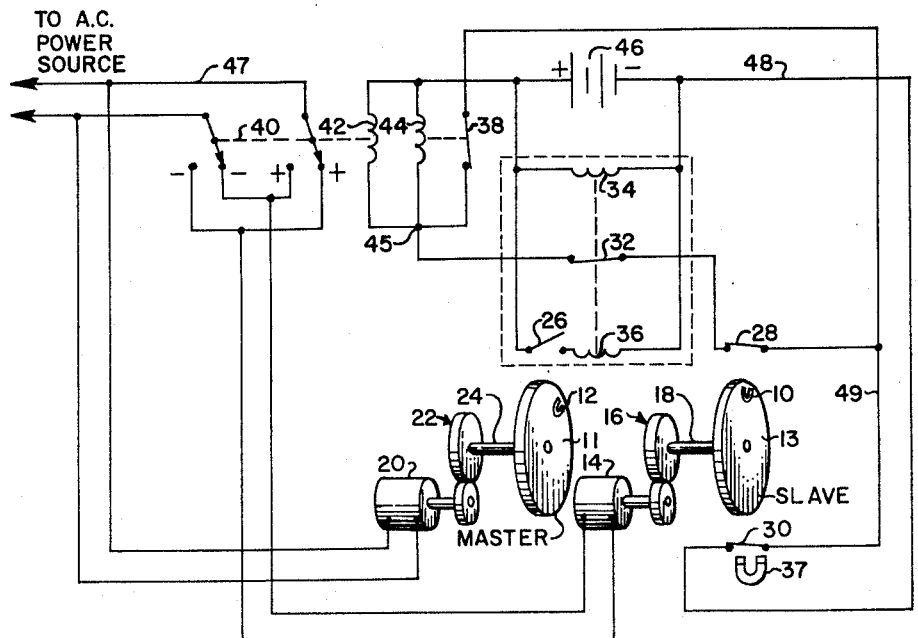
FIG. 2 shows the same circuit as FIG. 1 with the driven shaft lagging the driving shaft.

With reference to FIGS. 1 and 2, which relate to a system used with split phase motors, the system is seen to comprise a master motor 20 connected to an alternating current supply line, the motor driving a gear system shown symbolically as the first gear 22, a drive shaft 24, and a rotating disc 11 which is arranged on the drive shaft 24. The slave motor 14 rotates a gear system 16 connected to a drive shaft 18 upon which is located a rotor disc 13. The slave motor 14 is connected to the alternating current power line through a double-pole, double-throw reversing switch 40, which is actuated by a first solenoid coil 42 as will be hereinafter described. A first control switch 26 of the magnetic reluctance type is physically mounted off the rotation disc 11 of the master motor 20 but close enough to be activated by the magnetic field from a magnet 12 attached to the master motor rotor disc 11 near the periphery thereof, the switch 26 having a normally open position. One terminal of the switch 26 is connected to a battery 46, or other source of voltage, the other terminal of the switch being connected to a third solenoid 36 which in turn is connected to the other terminal of the battery 46. A first reset switch 32, a biasing coil 34, and the solenoid 36 comprise a differential relay. The biasing coil 34 is connected in electrical parallel with the terminals of the battery. The battery is connected to a magnetic reluctance reset switch 30 which is maintained in a normally closed position by a permanent magnet 37. The other terminal of the second reset switch 30 is connected through a lead 49 to the first terminal of a second control switch 38. The first solenoid 42 and a second solenoid 44 are connected in parallel, one common terminal being connected to the battery 46 and the other common terminal connecting to the second terminal of the second control switch 38. When energized, the first solenoid 42 is operative to actuate the double-pole, double-throw reversing switch 40, while the second solenoid 44 is operative to close the second control switch 38, which is normally in the open position when the second solenoid 44 is not energized. The junction 45 at which the first and second solenoids 42, 44 and the second control switch 38 have a common terminus, is connected to the differential relay which comprises magnetic first reset switch 32 physically arranged between the previously described solenoid 36 and biasing coil 34. The switch 32 is normally maintained in a closed position by energization of biasing coil 34 and is opened by energizing solenoid 36. The reset switch 32 is electrically connected to a third control switch 28 which is electrically tied to the lead 49. The control switch 28 is also of the magnetic reluctance type and is mounted off the rotation disc 13 of the slave motor 14 a distance permitting it to be actuated by the magnetic field of permanent magnet 10 which is mounted on the rotation disc 13 near the periphery thereof.

When the master and slave shafts are rotating in phase synchronism, both control switches 26, 28 will be closed simultaneously and momentarily during each revolution by virtue of the proximity of the permanent magnets 12, 10 respectively. However, no circuit is completed through the parallel solenoids 42, 44 since current through the third solenoid 36 when the first control switch 26 was closed caused the opening of the first reset switch 32. When the master and slave shafts 24, 18 are not in synchronism, the third control switch 28 will be closed by the magnet 10 on the rotation disc 13 at a different time from the closure of first control switch 26 by the magnet 12 of the master motor rotation disc 11, the first control switch 26 being open and the third control switch 28 being closed. A circuit is now completed from the battery 46 through the parallel solenoids 42, 44, the first reset switch 32 (which is physically arranged between the biasing coil 34 and the third solenoid 36), the third control switch 28 adjacent to the periphery of the slave rotation disc 13, through the second reset switch 30 and back to the other terminal of battery 46. The energization of the first solenoid 42 causes the operation of the double-pole, double-throw reversing switch 40, which causes the voltage supplied to the slave motor 14 to be reversed and causes the motor shaft 18 to slew 180 electrical degrees. This first solenoid 42 remains energized until the shaft 18 rotates 180 mechanical degrees, at which time the magnet 10 on the slave unit rotation disc 13 causes the second reset switch 30 to open. As a result, the circuit through the parallel solenoids 42, 44 is interrupted and the double-pole, double-throw reversing switch 40 returns to its initial position, causing the shaft of the slave motor 14 to slew another 180 electrical degrees. The described sequence will continue so long as the shafts 24, 18 are not in phase and will cease as soon as phase synchonism is regained.

The system hereinabove described accomplishes phase synchronism without mechanical contact between moving parts, thereby eliminating wear. Capacitor and inductive pickups could be used in place of the magnets on the rotation discs, while shaft phase sensing means could also include sliding contacts, or cam operated switches. Alternatively, the magnets on the rotating discs can be replaced by a light source on one side of the rotation disc of the master and pickup cells located on the opposite side of both the master and the slave rotation disc. A hole is drilled through each rotation disc and the different electrical current flow conditions experienced when the discs are not in synchronism (the light does not impinge upon the detector at the rotation disc of the slave unit) determines the position of the double-pole, double-throw reversing switch 40, thereby continually reversing the field of the slave unit 14 until phase synchronization with the master unit 20 is obtained. In yet another variation, a compressed air source jet is located on the far side of the master rotation disc 12 and the air jet is allowed to emerge through holes in both the master and slave rotation discs 12, 10, to transducers located on the opposite side of both discs. Again, when the discs are out of phase synchronism, the transducer associated with the slave disc will activate the circuit in a manner whereby the field on the slave motor will be constantly reversed until such time as the discs are again in synchronism.

Turning now to FIG. 3, there is shown a circuit diagram of an alternative embodiment of this invention. The master motor unit 50 is tied to an alternating current power source, the motor 50 driving gear means 52 which in turn rotates a shaft 54 on the end of which is located a master rotation disc 56 having a hole near the periphery thereof. Also tied to the same A.C. power source is a slave motor 58 driving gear means 60 which rotates a shaft 62 on the end of which is a slave rotation disc 64 having a similar hole 65 near the periphery thereof. The shaft 62 of the slave unit is required to rotate in phase synchronism with the shaft 54 of the master unit 50. While the master unit 50 may be of the type having a permanent magnet rotor or a direct current excited field, the slave motor 58 is of the type having a direct current excited field.

On the far side of the master rotation disc 56 is arranged a light source 53, either visible or invisible, which emits rays which are focused through the disc opening 55. When the master and slave discs are in phase alignment, the rays are directed through both discs. On the far side of the slave rotation disc 64 is arranged a light pickup device such as a photo cell or infrared detector 66, adapted to receive emissions from the light source 53, when the discs are in phase synchronism. The detector 66 is connected to a current amplifier 68, the output of which is fed to an astable or free-running multivibrator 70 which in turn controls power to the field winding of the slave motor 58.

In operation, the rays from the light source 53 are directed through the disc openings 55, 65 once each revolution when the units are in phase synchronism, and the rays impinge on the detector cell 66 which is arranged to receive the radiation through the opening 65 in the slave rotation disc 64. The current output from the detector 66 is fed to an amplifier 68 having an R-C time delay circuit which biases the multivibrator 70 in an astable or non-oscillating state so long as the detector 66 receives one pulse per rotation of the disc 64. Under such circumstances the polarity of the voltage supplied to the slave field winding remains unchanged. Should the units fall out of synchronism, however, the resulting lack of current flow from the detector 66 will cause the R-C circuit to discharge and permit the multivibrator 70 to go into its free-running state. Each half cycle of oscillation, being of opposite polarity, will reverse the field of the slave 58 and cause the slave to ultimately slew to synchronism with the master 50. The frequency of oscillation of the multivibrator may be selected to correspond to the frequency of rotation of the slave motor disc, that is, the frequency in c.p.s. of the multivibrator will be equal to the rotational speed in revolutions per second of the discs. This will cause the slave to slew twice per cycle when out of synchronism. Once the discs are synchronized, the reception of pulses by the detector 66 will cause stabilization of the multivibrator 70 until such time as the rotating units again lack phase synchronism. Typical astable multivibrators may be found at pages 171 et. seq. of the publication, "Waveforms," vol. 19, Radiation Laboratory Series, published by McGraw-Hill Book Co., Inc., New York, 1949. The amplifier 68 and the R-C circuit thereof are all within the knowledge of one skilled in the art, however, a typical phototube amplifier circuit may be found at pages 286, et seq. of "Fundamentals of Vacuum Tubes" by Eastman, second edition, published by McGraw-Hill Book Co., Inc., 1941.

While particular circuits have been specifically described and illustrated, it is to be understood that similar circuits may be provided for three-phase synchronous motors and other modifications or changes may be made by those skilled in the art without departing from the scope of the invention, as defined by the appended claims.

What is claimed is:

1. Means for automatically detecting and controlling shaft phase ambiguities caused by gear trains between a reference polarized synchronous motor and a shaft driven thereby and a polarized synchronous motor slaved to said reference motor and a shaft driven by said slave motor, the said shafts being required to rotate in synchronism, comprising: a circuit including an alternating current power source for each of said motors, the reference motor being connected directly to said alternating current power source; a reversing switch for reversing the connections to the alternating current power supply to said slave motor; electrically operated means controlling said reversing switch; and means sensing lack of in-phase relation of the driven and slave shafts at each revolution operating said reversing switch means to reverse the polarity of the supply power to the slave motor to cause a change of phase of the stator magnetic field with respect to the rotor field during each revolution and continuing said reversals of the stator field until synchronism is re-established.

2. Means for automatically detecting and controlling phase ambiguities caused by gear trains between a reference polarized synchronous motor and a shaft driven thereby and a polarized synchronous motor slaved to said reference motor and a shaft driven by said slave motor, the said shafts being required to rotate in synchronism, comprising: a circuit including an alternating current power source for each of said motors, the reference motor being connected directly to said power source; a reversing switch controlling the alternating current power supply to said slave motor; electrically operated means controlling said reversing switch; means sensing lack of proper phase relation of the driven and slave shafts at each revolution; and switch means actuated by said sensing means and effective to reverse the polarity of the power supplied to the slave motor to cause change of phase of the magnetic field during each half rotation of the shafts and resetting the reversing switch for the succeeding half revolution and continuing said reversals of the stator field until synchronism is re-established.

3. In combination: a reference polarized synchronous electric motor having a first shaft rotated thereby; a slave polarized synchronous electric motor having a second shaft rotated thereby, said shafts being required to rotate in phase synchronism; a reversing switch through which electric power is delivered to said slave synchronous motor; a first solenoid means controlling said reversing switch, said solenoid means being adapted to be energized by a direct current voltage; a first magnetically operated reset switch and a third magnetically operated control switch serially connecting with said first solenoid means; a second solenoid means in electrical parallel with said first solenoid means; a second control switch adapted to be closed by the energization of said second solenoid means; a first magnetically operated control switch; a third solenoid means serially connected to said first control switch, the magnetic field from said third solenoid means when energized being effective to open said first reset switch; a second magnetically operated reset switch serially connected between said third control switch and said third solenoid means; a biasing coil connected in electrical parallel with said first control switch and said third solenoid means; and magnets identically arranged on parts rotated by said first and second shafts adapted to simultaneously, and for finite periods of time, close said first control and third control switches when the first and second shafts are in phase synchronism, whereby the reversing switch is actuated to reverse the polarity of current flow through the slave synchronous motor for each half revolution of the magnet rotated by the second shaft until the shafts are again in phase synchronism.

4. In a system comprising a pair of shafts arranged to rotate in synchronism and driven by respective synchronous motors one of which is a reference motor and the other a slave motor, each of said motors being supplied with driving power from terminals of an alternating voltage means, the said terminals for the two motors having the same frequency and phase relationships, means for reducing angular differences between said rotating shafts comprising: a first magnet means connected with and rotating with the reference shaft and a second magnet means connected with and rotating with the slave shaft, a polarity-reversing switch in the power supply of the slave motor, means controlling the positions of said reversing switch comprising auxiliary means for supplying voltage, a first control circuit, a second control circuit and a re-set circuit, said first control circuit comprising a solenoid, a normally closed first switch, a normally open second switch, and a normally closed reset switch in series with each other and connected across voltage of said auxiliary source, said second control circuit comprising a normally open first switch and a solenoid in series and connected across voltage of said auxiliary source, said reset circuit comprising said normally closed first control circuit reset switch, a lock-in switch and said first control circuit solenoid in series with each other and connected across voltage of said auxiliary source, and another solenoid connected in parallel with said first control circuit solenoid, said other solenoid being in operating relationship with said polarity-reversing switch so that when energized the polarity-reversing switch is in one position which is the normal polarity position and when de-energized is in another position which is the polarity-reversing position, said first control circuit solenoid being operatively related to the reset circuit lock-in switch so that when energized the lock-in switch is closed and when de-energized the lock-in switch is open, said second control circuit solenoid being operatively related to the first control circuit first switch so that when energized the first control circuit first switch is open and when de-energized said switch is closed, said second control circuit first switch being related to said first magnet means so that said second control circuit first switch closes when said first magnet means is adjacent thereto and opens when said first magnet means rotates away from said switch, said first control circuit second switch being related to said second magnet means so that said switch closes when said second magnet means moves adjacent thereto and opens when said second magnet means moves away from said switch, said first control circuit reset switch being related to said second magnet means at an angular position away from said first control circuit second switch so that said first control circuit reset switch opens when said second magnet means in its rotation moves adjacent thereto and closes when said second magnet moves away from said reset switch.

5. In combination: a first synchronous electric motor, a second synchronous electric motor, both said motors driving output shafts in phase synchronism through equal ratio gear trains, means for reversing the polarity of the electric power supplied to the field winding of said second motor, radiation means, means for detecting emissions from said radiation means when said motors are in phase synchronism, said detection means being operative to actuate said reversing means throughout the time interval during which said first and second motors are unsynchronized, whereby the polarity of the electric power supplied to the field winding of said second motor is reversed twice each revolution of said output shafts.

6. In combination: a reference polarized synchronous electric motor having a first shaft rotated thereby; a slave polarized synchronous electric motor having a second shaft rotated thereby, said shafts being required to rotate in phase synchronism; first and second rotational members mounted on said first and second shafts respectively, said members having openings therethrough which are in axial alignment when said shafts are in axial alignment; an optical radiation device; means for detecting emissions from said radiation device along a path through the openings in said rotational members when said rotational members are in phase synchronism; means for reversing the polarity of the voltage supplied to the field winding of said slave motor; said reversing means being operative to reverse the polarity of the voltage supplied to said field winding twice each revolution of the shafts throughout the time interval during which said first and second shafts are unsynchronized, in response to actuation by said detection means.

7. A device as described in claim 6 wherein said voltage polarity reversing means is an astable multivibrator which is in a non-oscillating state when said detection device receives emissions, and is in its free-running state when no radiation is received.

8. Means for automatically detecting and controlling phase ambiguities caused by gear trains between a reference polarized synchronous motor and a shaft driven thereby and a polarized synchronous motor slaved to said reference motor and a shaft driven by said slave motor, the said shafts being required to rotate in synchronism, comprising: a circuit including an A.-C. voltage source for each of said motors, the reference motor being connected directly to said A.-C. voltage source; a reversing switch controlling the phase of the A.-C. voltage supply to said slave motor; electrically operated means controlling said reversing switch; and means sensing lack of synchronism of the driven shaft at each revolution and operating said reversing switch means to reverse the polarity of the supply voltage to the slave motor to cause change of phase of the stator magnetic field with respect to the rotor field during each revolution and continuing said reversals of the stator field until synchronism is re-established.

9. Means for automatically detecting and controlling phase ambiguities caused by gear trains between a reference polarized synchronous motor and a shaft driven thereby and a polarized synchronous motor slaved to said reference motor and a shaft driven by said slave motor, the said shafts being required to rotate in synchronism, comprising: a circuit including an A.-C. voltage source for each of said motors, the reference motor being connected directly to said A.-C. voltage source; a reversing switch controlling the A.-C. voltage supply to said slave motor; electrically operated means controlling said reversing switch; and means sensing lack of synchronism of the driven shaft at each revolution and switch means actuated by said sensing means and effective to reverse the polarity of the supply voltage to the slave motor to cause change of phase of the stator magnetic field with respect to the rotor field during each half rotation and resetting the reversing switch for the succeeding half revolution and continuing said reversals of the stator field until synchronism is re-established.

References Cited in the file of this patent
UNITED STATES PATENTS

| | | |
|---|---|---|
| 1,658,660 | Traver | Feb. 7, 1928 |
| 1,963,087 | Hay | June 19, 1934 |